US011302333B2

(12) United States Patent
Sung et al.

(10) Patent No.: US 11,302,333 B2
(45) Date of Patent: *Apr. 12, 2022

(54) ASYNCHRONOUS PROCESSING OF USER REQUESTS

(71) Applicant: Google LLC, Mountain View, CA (US)

(72) Inventors: Sang Soo Sung, Palo Alto, CA (US); David P. Whipp, Mountain View, CA (US); Jing Qian, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,893

(22) Filed: Sep. 11, 2020

(65) Prior Publication Data

US 2020/0411009 A1 Dec. 31, 2020

Related U.S. Application Data

(63) Continuation of application No. 16/406,456, filed on May 8, 2019, now Pat. No. 10,777,204, which is a
(Continued)

(51) Int. Cl.
*G10L 17/22* (2013.01)
*G10L 15/30* (2013.01)
(Continued)

(52) U.S. Cl.
CPC .......... *G10L 15/30* (2013.01); *G06Q 10/0631* (2013.01); *G10L 15/22* (2013.01);
(Continued)

(58) Field of Classification Search
CPC ... G10L 2015/22; G10L 17/22; G10L 15/142; G10L 15/22
See application file for complete search history.

(56) References Cited

U.S. PATENT DOCUMENTS 6,732,124 B1 5/2004 Koseki et al.
8,452,602 B1 * 5/2013 Bringert .................. G10L 15/22
704/275
(Continued)

FOREIGN PATENT DOCUMENTS

CN 101163173 4/2008
CN 101911064 12/2010
(Continued)

OTHER PUBLICATIONS

Korean Intellectual Property Office; Office Action issued for Application No. 10-2019-7000230 dated Jul. 6, 2020.
(Continued)

*Primary Examiner* — Feng-Tzer Tzeng
(74) *Attorney, Agent, or Firm* — Middleton Reutlinger

(57) ABSTRACT

Methods, systems, and apparatus, including computer programs stored on a computer-readable storage medium, for asynchronous execution of client requests. In some implementations, data indicating a user request to a digital assistant is received. An action corresponding to the user request is determined. It is determined that the action is classified as an action to be performed asynchronously to the user request. A confirmation message is sent, for output, and the action is performed asynchronously to the user request.

19 Claims, 3 Drawing Sheets

Related U.S. Application Data continuation of application No. 15/193,929, filed on Jun. 27, 2016, now Pat. No. 10,339,934.

(51) Int. Cl.
  *G06Q 10/06* (2012.01)
  *G10L 15/22* (2006.01)
  *G10L 15/26* (2006.01)
  *G10L 13/00* (2006.01)

(52) U.S. Cl.
  CPC .............. *G10L 15/26* (2013.01); *G10L 13/00* (2013.01); *G10L 17/22* (2013.01); *G10L 2015/223* (2013.01); *G10L 2015/225* (2013.01)

(56) References Cited

U.S. PATENT DOCUMENTS

| | | | |
|---|---|---|---|
| 2001/0054108 A1* | 12/2001 | Lincoln .............. | H04Q 11/0067 709/238 |
| 2005/0021529 A1 | 1/2005 | Hodson et al. | |
| 2005/0131862 A1* | 6/2005 | Sinclair ................. | G06F 16/958 |
| 2007/0050191 A1 | 3/2007 | Weider et al. | |
| 2007/0050360 A1 | 3/2007 | Hull et al. | |
| 2009/0150156 A1* | 6/2009 | Kennewick ............. | G10L 15/00 704/257 |
| 2009/0248629 A1 | 10/2009 | Marin | |
| 2009/0313311 A1 | 12/2009 | Hoffmann et al. | |
| 2011/0137909 A1 | 6/2011 | Guertler et al. | |
| 2013/0315227 A1 | 11/2013 | Hughston | |
| 2015/0295854 A1 | 10/2015 | Sun | |
| 2016/0155442 A1 | 6/2016 | Kannan et al. | |

FOREIGN PATENT DOCUMENTS

| | | |
|---|---|---|
| CN | 104584096 | 9/2017 |
| JP | 2000200125 | 7/2000 |
| JP | 2006139491 | 6/2006 |
| JP | 2014191030 | 10/2014 |
| JP | 2015135419 | 7/2015 |
| JP | 2015210778 | 11/2015 |
| KR | 20070049930 | 5/2007 |
| KR | 20130069802 | 6/2013 |
| WO | 2016054230 | 4/2016 |

OTHER PUBLICATIONS

Anonymous: "Message Passing—Wikipedia", Oct. 30, 2015 (Oct. 30, 2015), XP055640591, Retreived from the Internet: URL:https://en.wikipedia.org/w/index.php?title=Message_passing&oldid=688233972 [retrieved on Nov. 8, 2019].

European Patent Office; Examination Report issued for Application No. 16816800.3 dated Jul. 16, 2020.

Japan Patent Office; Notice of Allowance issued in Application No. 2018-561952, 3 pages; dated Jan. 20, 2020.

Google Developers, "Get Started with System Voice Actions," Google, Nov. 2, 2015 [retrieved on Jun. 27, 2016] retrieved from the Internet: https://developers.google.com/voice-actions/system/#search_actions, 7 pages.

Google Developers, "Voice Interactions," Google, Jun. 8, 2016 [retrieved on Jun. 27, 2016]; retrieved from the Internet: https://developers.google.com/voice-actions/interaction/voice-interactions; 6 pages.

Huang, "Implementing Google Voice Actions into Your Android App," Prolific Interactive Blog, Nov. 6, 2015 [retrieved on Jun. 27, 2016]; retrieved from the Internet: URL http://blog.prolificinteractive.com/2015/11/06/implementing-google-voice-actions-into-your-android-app; 11 pages.

International Search Report and Written Opinion in International Application No. PCT/US2016/064368; 11 pages; dated Feb. 21, 2017.

PCT Written Opinion issued in International Application No. PCT/US2016/064368; 8 pages; dated Jun. 22, 2018.

PCT International Preliminary Reporton Patentability issued in International Application No. PCT/US2016/064368; 22 pages; dated Sep. 26, 2018.

The Korean Patent Office; Notice of Allowance issue in Application No. 1020197000230; 3 pages; dated Jan. 13, 2021.

European Patent Office; Summons issued for Application No. 16816800.3; 13 pages; dated Apr. 19, 2021.

China Patent Office; Office Action issued in Application No. 201680086163.3; 10 pages; dated Aug. 2, 2021.

The Korean Intellectual Property Office; Notice of Office Action issued in Application No. 1020217010638; 6 pages; dated Jun. 10, 2021.

The Korean Intellectual Property Office; Notice of Allowance issued in Application No. 1020217010638 3 pages; dated Oct. 7, 2021.

China National Intellectual Patent Office: Notice of Grant issued for Application No. 201680086163.3; 5 pages; dated Jan. 14, 2022.

* cited by examiner

ASYNCHRONOUS PROCESSING OF USER REQUESTS

BACKGROUND

Some phones and other devices provide digital assistant functionality that allows a user to submit queries and make other requests. For example, a user may speak a voice query to a device, and the device may obtain and present search results in response to the query. Digital assistant functionality may involve processing by a server system, for example, to perform speech recognition.

SUMMARY

In some implementations, at least some user requests made to a digital assistant, e.g., a conversational agent, can be performed asynchronously to the user's request. Users may submit various types of requests to a digital assistant, some of which may not require execution to be immediate or synchronous with the user's request. A server system can identify user requests that are appropriate for asynchronous execution, and decouple the timing for carrying out those requests from the user's conversation with the digital assistant. As a result, the system can avoid delays that could block the user from making other requests to the digital assistant. For example, with synchronous execution, a user is typically required to wait until the most recently requested action is completed before the user may issue a new request. These delays can be avoided with asynchronous processing, however, since new requests can be received and processed in parallel with previously requested actions that are in process or are scheduled to be performed. As an example, when a first action is selected for asynchronous execution, the digital assistant can provide confirmation that the first action will be executed, and receive and process further requests from the user before the first action has completed.

The techniques used by the server system to select between synchronous and asynchronous actions requested by a user may also be performed by one or more client devices, or by a combination of a server system and one or more client devices. For example, a client device can evaluate user request to determine whether to perform a particular request synchronously or asynchronously with respect to the request. As discussed below, this can enable a client device to handle temporary network outages and other connection disturbances.

To enhance reliability and dependability, asynchronous execution can be made subject to certain time constraints. With asynchronous execution, actions are not required to be performed in sequence with or immediately after a request, and so can be performed after the user's conversation with the digital assistant has moved on to other topics. However, a server system can monitor the execution of the action and take steps to ensure that execution occurs within a reasonable amount of time. For example, a timeout period can be set for execution of an action. If execution is not completed within the timeout period, the server system can retry the action or notify the user of a delay or failure. These constraints can be implemented as "soft" real-time constraints, so that actions may be performed with some allowable amount of delay, yet are guaranteed to occur soon enough that the difference from synchronous execution is negligible to the user.

As an example, a user may request a calendar appointment to be set for a certain time on the following day. The digital assistant system may determine that the action of setting the appointment may be performed asynchronously, e.g., because the action does not require immediate processing or output to the user. Nevertheless, the digital assistant system may set a time constraint, such as 5 minutes or 15 minutes from the time of the user's request, for performing the action and synchronizing data among the user's various devices. This constraint allows the digital assistant system the flexibility of delaying execution, e.g., for load balancing or to manage delays of third-party server systems, while also limiting potential inconvenience to the user, who may wish to view upcoming appointments not long after making the request.

One innovative aspect of the subject matter described in this specification is embodied in methods that include the actions of: receiving data indicating a user request to a digital assistant; determining an action corresponding to the user request; determining that the action is classified as an action to be performed asynchronously to the user request; and based on determining that the action is classified as an action to be performed asynchronously to the user request: (i) sending a confirmation message for output; and (ii) causing the action to be performed asynchronously to the user request.

Other embodiments of this and other aspects include corresponding systems, apparatus, and computer programs, configured to perform the actions of the methods, encoded on computer storage devices. A system of one or more computers or other processing devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features.

In some implementations, receiving the data indicating user input to the digital assistant includes receiving audio data comprising a voice command; the method includes performing automated speech recognition to determine a transcription for the voice command; and determining the action corresponding to the user input includes determining the action based on the transcription.

In some implementations, the user request is a first user request from a user, and causing the action to be performed asynchronously to the user request includes receiving one or more other user requests from the user to the digital assistant before performing the action requested by the first user request.

In some implementations, the user request is a first user request, and causing the action to be performed asynchronously to the user request includes performing actions corresponding to one or more other user requests from the user to the digital assistant before performing the action requested by the first user request.

In some implementations, sending the confirmation message for output includes sending a confirmation message indicating that the action will be performed.

In some implementations, a text-to-speech system is used to generate audio data comprising synthesized speech; and sending the confirmation message includes sending the generated audio data comprising the synthesized speech.

In some implementations, determining that the action is classified as an action to be performed asynchronously to the user request includes: determining that the action corresponds to a particular action type; accessing assignment data that indicates whether different action types are assigned to be executed synchronously or asynchronously to a request; and determining, based on the assignment data, that the particular action type is assigned to be executed asynchronously to a request.

In some implementations, determining that the action is classified as an action to be performed asynchronously to the user request includes: identifying an application or server configured to perform the action; and determining that requests to the identified application or server have been designated for asynchronous processing.

In some implementations, causing the action to be performed asynchronously to the user request includes: storing a record indicating the action that is requested; and based on the stored record, sending a request to a server system to perform the action.

In some implementations, causing the action to be performed asynchronously to the user request includes: selecting, based on the identified action, an area of a data storage system; sending a write request to store data about the action in the selected area; in response to the write request, issuing a remote procedure call to execute software corresponding to the selected area of the data storage system; and generating, using the executed software, a request to an application server to perform the action.

In some implementations, causing the action to be performed asynchronously to the user request includes: sending a request to a server system to perform the action; setting a timeout period for completion of the action; determining that the action is completed before the end of the timeout period; and storing data indicating execution of the action.

In some implementations, additional features include: receiving data indicating a second user request to the digital assistant; determining a second action corresponding to the second user request; determining that the second action is not classified as an action to be performed asynchronously to the second user request; and based on determining that the second action is not classified as an action to be performed asynchronously to the second user request, causing the second action to be performed synchronously with respect to the user request.

In some implementations, additional features include: receiving data indicating a second user request to the digital assistant; determining a second action corresponding to the second user request; determining that the second action is classified as an action to be performed asynchronously to the second user request; based on determining that the second action is classified as an action to be performed asynchronously to the second user request, initiating performance of the second action; determining that the second action is not performed within a timeout period; and providing, for output, a message indicating that performance of the second action has failed.

Advantageous implementations can include one or more of the following features. For example, the techniques disclosed in this document can reduce delays, increase reliability, and increase efficiency of handling user requests, such as requests to a digital assistant. In some digital assistant systems, processing of user requests can result in delays that block a user from making additional requests until a first request is completed. Some digital assistants use a combination of client-based and server-based processes to handle voice inputs, resulting in delays for several communications back and forth between a client device and server. A first network round-trip may be required for a client device to send speech data to a server for speech recognition and then receive a transcription of the speech data. Once the client device processes the transcribed text, a second network round-trip may then be required for a local application of the client device to communicate with a back-end application server and receive confirmation from the application server. The delay can be significant, especially when a third-party server is slow to respond or is temporarily unavailable. These network operations, plus the time needed for processing at each stage, can result in undesirable delays between a voice request and completion of the requested action. These delays can block the user from carrying out other tasks in the meantime, since the conversation with the digital assistant often cannot continue until processing of the current request is completed.

The asynchronous processing techniques discussed below can reduce or eliminate delays experienced by a user, and can allow the user to continue a conversation with the digital assistant before the action requested by a current request has been performed. Actions can be executed asynchronously from the corresponding request, which decouples the timing of execution of the action from the ongoing conversation with the assistant. A time period for the action can also be imposed so that the asynchronous execution occurs reliably without inconveniencing the user.

The disclosed techniques for asynchronously processing voice commands at a server can also increase the reliability and flexibility of a digital assistant. Some digital assistants rely on a client device to manage or initiate actions that a user requests. Certain actions may require specific applications to be installed at the client device for an action to be carried out. However, the requested action may not be performed if the client device lacks appropriate processing capability, does not have an appropriate application installed, or is otherwise improperly configured to perform the action. Executing actions at the server increases reliability because execution does not depend on capabilities of the client device. This allows the digital assistant to be used with platforms having lower hardware and software requirements, including such as wearable devices or embedded devices that may not have appropriate applications for handling an action.

For example, a user may speak a command "Add bread to the shopping list" that is received by the user's watch. The watch is not required to include a list management application to perform the action, since one or more servers can perform the action and also cause the new list information to be synchronized to the user's devices that do have the list management application. As a result, with the asynchronous server-based execution of actions, any request that the server can fulfill can be made to the digital assistant at any client device, regardless of the client device's ability to fulfill the request.

The disclosed techniques can also improve efficiency of responding to user requests. A server can create a queue of actions to be performed asynchronously on behalf of many users. Because the actions are performed asynchronously, the delays in execution can vary according to the volume of user requests without affecting the user experience. Processing delays are hidden from the user, allowing a server to handle a larger peak volume of requests by spreading the execution of actions over time. While some delays are permitted, the amount of delay for each action can be constrained. Actions can be required to occur within a time period of, e.g., 5 minutes, or 15 minutes, or another time period, to provide "soft" or approximate real-time execution.

The techniques also increase efficiency of processing at user devices. Since the server handles execution of the voice command, less processing needs to be done by the user device. This reduces power consumption and increases battery life, while enhancing the ability of the digital assistant to be used with devices such as a watch or other wearable device that has limited processing capabilities.

In addition, the asynchronous nature of processing can allow a device to cache interactions or deal with low connectivity. A queue of commands may be created at a device and then be sent for later execution. A device that lacks connectivity to a server can still receive commands and store them, then send them to a server for processing once connectivity is restored. Similarly, if a first server attempts to perform an action using a third-party server that is unavailable, the first server can delay or retry the action until the action succeeds or the user needs to be notified of the failure.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
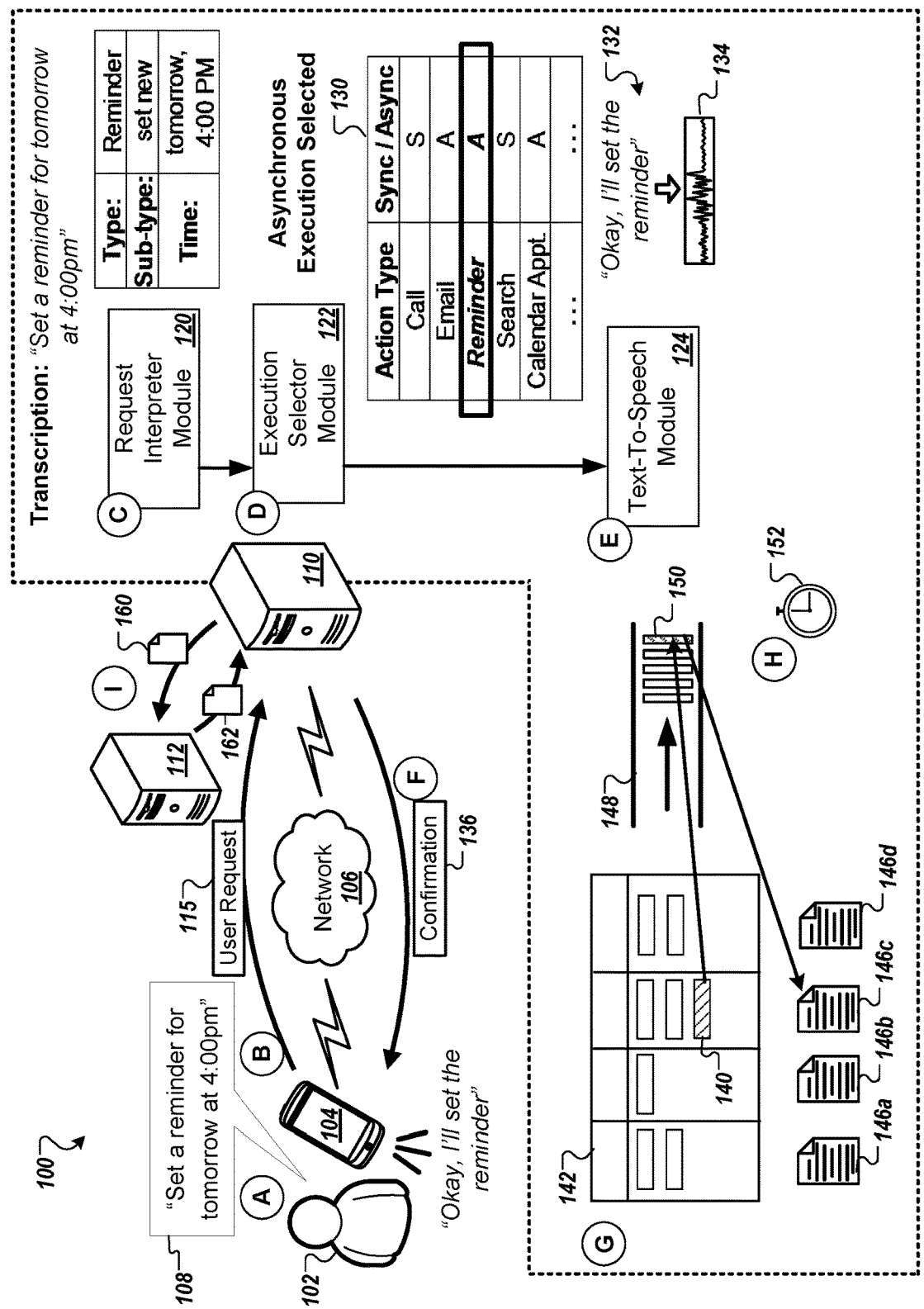
FIGS. 1 and 2 are diagrams that illustrates an example of a system for asynchronous processing of user requests.

FIG. 1 is a diagram that illustrates an example of a system 100 for asynchronous processing of user requests. The system 100 includes a user device 104 that a user 102 can use to access digital assistant functionality. The user device 104 communicates with a server system 110 over a network 106. The network 106 can include public and/or private networks and can include the Internet. The server system 110 also communicates with an application server 112 to cause requested actions to be performed. FIG. 1 also illustrates a flow of data, shown as stages (A) to (I), which represent a flow of data. Stages (A) to (I) may occur in the illustrated sequence, or in a sequence that is different from the illustrated sequence. For example, some of the stages may be occur concurrently.

The user device 104 can be a computing device, e.g., a mobile phone, smart phone, personal digital assistant (PDA), music player, e-book reader, tablet computer, a wearable computing device, laptop computer, desktop computer, or other portable or stationary computing device. The user device 104 can feature a microphone, keyboard, touchscreen, or other interface that enables the user 102 to provide inputs to the user device 104.

The server system 110 can include one or more computers. In some implementations, one or more computers of the server system 110 may communicate with the user device 104 and one or more other computers may perform other tasks such as speech recognition, text-to-speech processing, analysis of user requests, and so on.

The application server 112 can be a server that supports one or more applications. The application server 112 can be a third-party server, operated independently of the server system 110. For example, the third-party server can be a back-end application server that provided information for display on or for the configuration of applications on the user device 104. The server system 110 can communicate with multiple application servers 112, and each may correspond to a different application. For example, the server system 110 may communicate with a first application server to perform actions regarding a reminder application, with a second application server to perform actions regarding a calendar application, and so on.

The network 106 can include public and/or private networks and can include the Internet.

The techniques disclosed in this document can reduce delays, increase reliability, and increase efficiency of handling user requests, such as requests to a digital assistant. In some digital assistant systems, processing of user requests can result in delays that block a user from making additional requests until a first request is completed. Some digital assistants use a combination of client-based and server-based processes to handle voice inputs, resulting in delays for several communications back and forth between a client device and server. A first network round-trip may be required for a client device to send speech data to a server for speech recognition and then receive a transcription of the speech data. Once the client device processes the transcribed text, a second network round-trip may then be required for a local application of the client device to communicate with a back-end application server and receive confirmation from the application server. The delay can be significant, especially when a third-party server is slow to respond or is temporarily unavailable. These network operations, plus the time needed for processing at each stage, can result in undesirable delays between a voice request and completion of the requested action. These delays can block the user from carrying out other tasks in the meantime, since the conversation with the digital assistant often cannot continue until processing of the current request is completed.

The asynchronous processing techniques discussed below can reduce or eliminate delays experienced by a user, and can allow the user to continue a conversation with the digital assistant before the action requested by a current request has been performed. Actions can be executed asynchronously from the corresponding request, which decouples the timing of execution of the action from the ongoing conversation with the assistant. A time period for the action can also be imposed so that the asynchronous execution occurs reliably without inconveniencing the user.

The disclosed techniques for asynchronously processing voice commands at a server can also increase the reliability and flexibility of a digital assistant. Some digital assistants rely on a client device to manage or initiate actions that a user requests. Certain actions may require specific applications to be installed at the client device for an action to be carried out. However, the requested action may not be performed if the client device lacks appropriate processing capability, does not have an appropriate application installed, or is otherwise improperly configured to perform the action. Executing actions at the server increases reliability because execution does not depend on capabilities of the client device. This allows the digital assistant to be used with platforms having lower hardware and software requirements, including such as wearable devices or embedded devices that may not have appropriate applications for handling an action.

For example, a user may speak a command "Add bread to the shopping list" that is received by the user's watch. The watch is not required to include a list management application to perform the action, since one or more servers can perform the action and also cause the new list information to be synchronized to the user's devices that do have the list management application. As a result, with the asynchronous server-based execution of actions, any request that the server can fulfill can be made to the digital assistant at any client device, regardless of the client device's ability to fulfill the request.

The disclosed techniques can also improve efficiency of responding to user requests. A server can create a queue of actions to be performed asynchronously on behalf of many users. Because the actions are performed asynchronously, the delays in execution can vary according to the volume of user requests without affecting the user experience. Processing delays are hidden from the user, allowing a server to handle a larger peak volume of requests by spreading the execution of actions over time. While some delays are permitted, the amount of delay for each action can be constrained. Actions can be required to occur within a time period of, e.g., 5 minutes, or 15 minutes, or another time period, to provide "soft" or approximate real-time execution.

The techniques also increase efficiency of processing at user devices. Since the server handles execution of the voice command, less processing needs to be done by the user device. This reduces power consumption and increases battery life, while enhancing the ability of the digital assistant to be used with devices such as a watch or other wearable device that has limited processing capabilities.

In addition, the asynchronous nature of processing can allow a device to cache interactions or deal with low connectivity. A queue of commands may be created at a device and then be sent for later execution. A device that lacks connectivity to a server can still receive commands and store them, then send them to a server for processing once connectivity is restored. Similarly, if a first server attempts to perform an action using a third-party server that is unavailable, the first server can delay or retry the action until the action succeeds or the user needs to be notified of the failure.

In the example of FIG. 1, the user 102 makes a request to a digital assistant using the user device 104. The request is provided to the server system 110, which determines that an action requested by the user 102 can be performed asynchronously to the request. As a result, before the requested action is executed, the server system 110 sends confirmation to the user device 104 indicating that the requested action will be performed. This allows the user to make further requests to the digital assistant while the server system 110 manages execution of the already-requested action in parallel. Although the action is performed asynchronously, the server system 110 imposes constraints on the timing of execution so that the action occurs within an appropriate amount of time, e.g., within a maximum time period.

In further detail, in stage (A), the user device 104 receives a user request from the user 102. The user 102 may make the request to digital assistant functionality accessed through or provided by the user device 104. The user 102 may invoke the digital assistant in any multiple ways, such as speaking a hotword, pressing an on-screen button, pressing and holding a "home" button, performing a gesture. The user may make the request through any appropriate type of user input, such as typed input or voice input. In the illustrated example, the user 102 speaks a voice command 108, "Set a reminder for tomorrow at 4:00 pm." The user device 102 detects the spoken input and records audio data that represents the voice command 108.

In stage (B), the user device 104 sends data indicating the user request 115 to the server system 110. For example, when the request is made as a voice input, the user device 104 can provide audio data for the user's utterance. The audio data can be an audio waveform recorded by the user device 102, a compressed form of the audio information, or information derived or extracted from recorded audio, such as data indicating speech features such as mel-frequency coefficients.

In stage (C), the server system 110 interprets the user request 115 to determine what action the user 102 has requested to be performed. The server system 110 can also determine other details about how the action should be performed. The server system 110 includes a request interpreter module 120 that analyzes the request. In some implementations, the request interpreter module 120 obtains text representing the user request. For voice requests, the request interpreter module 120 may obtain a transcription for received audio from an automated speech recognizer, which may be provided by the server system 110 or another system.

The request interpreter module 120 then extracts information from the request to determine the parameters of the request. For example, a type or category for the requested action can be identified. The request interpreter module 120 can parse the user's request and identify terms, phrases, or patterns that indicate different actions. For example, a mapping between terms and action types can be accessed, and the module 120 can look up an appropriate action type for the terms of the user's request using the mapping. As another example, the text of the request can use grammars that are known to represent requests for certain types of actions. When the user request matches one of the grammars, an action type corresponding to the grammar can be selected. As another example, a classifier or machine learning system can analyze the request to determine what action the user 102 has requested.

In the example of FIG. 1, the transcribed text of the voice command 108, "set a reminder for tomorrow at 4:00 pm," is analyzed. The request interpreter module 120 determines that the request is for the action type of "Reminder." This action type is selected from a set of multiple predetermined action types, including call, email, reminder, search, calendar, text message, and so on, where each action type is associated with one or more keywords or grammars. Other types of actions can also be used. For example, the system 110 can be configured to receive and process requests regarding home automation, such as turning lights or appliances on and off, or locking, unlocking, opening, or closing a door. Determining that the user's interaction with the digital assistant requests an action of a particular type can assist in determining how to process the request later.

In some implementations, the request interpreter module 120 determines other parameters of the action requested by the user 102. For example, by parsing the text representing the user's request, data indicating details of how the action should be performed are determined. In the example of FIG. 1, the request interpreter module 120 determines that, within the general class of "Reminder" actions, the action involves setting a new reminder, e.g., based on the term "set." This helps define the particular action requested and distinguish it from other actions that are also of the "Reminder" action type. For example, a reminder application may allow a certain set of actions, such as setting a new reminder, changing the time of a reminder, changing a description of a reminder, or cancelling a reminder. The request interpreter module 120 may determine what information is used by a reminder application, e.g., fields or inputs provided through an application programming interface (API), and determine corresponding values based on analysis of the user request. As another example, the request interpreter module 120 can determine that the requested reminder is for a date "tomorrow" and time "4:00 pm." Each action type can have an associated set of data types or fields used to specify the characteristics of actions of that action type. The request interpreter module 120 can access stored data to determine which parameters are relevant to the action type, and also determine which parameters are indicated by the text of the user request.

In some implementations, a particular application, an application type, or service that would perform the requested action is identified. For example, a particular action type may be associated with one or more applications or services. In some implementations, an action type corresponds to a single application or service. When the user requests a reservation at a restaurant, for example, a corresponding application or service capable of performing the action may be identified. Similarly, for a request to set a calendar appointment, the request can be identified as corresponding to the "calendar" action type. Before the request, the "calendar" action type can be associated with a calendar application or service, so that the appropriate types of data, data formats, and so on that may be needed to carry out a calendar action are available when the request is received.

In stage (D), the server system 110 determines whether the action that the user requested should be performed synchronously or asynchronously with respect to the user's request. The server system 110 can select the appropriate type of execution based on characteristics of the action requested. For example, the server system 110 can determine whether the action is classified as an action to be performed asynchronously to the user request based on the action type or other characteristics of the action.

Users generally expect that some actions, like making a phone call or obtaining search results, will be performed without delay. Other actions, like setting a calendar appointment, are not required to be performed immediately. A modest delay in setting a calendar appointment generally does not inconvenience a user, as long as the action is performed before the scheduled time and before the user opens the calendar to view that day's appointments. Other requirements can also be considered when assigning an action for synchronous or asynchronous execution, such as the requirements of third-party systems used to carry out the action. For example, synchronous execution can be required for actions that require communication with a third-party server that has a short time-out, such as a two-minute maximum before airline tickets, movie seats, or restaurant reservations are released for purchase by others. These and other factors can be used to pre-designate which actions or action types should use asynchronous execution, before a user request is received. In addition, or as an alternative, the factors can be considered in response to receiving a user request.

As an example, the server system 110 can use an execution selector module 122 to select between different modes of executing the action the user requested. The execution selector module 122 can access assignment data 130 that indicates which action types are designated for synchronous processing, and which action types are designated for asynchronous processing. For example, the assignment data 130 in FIG. 1 maps each action type to either synchronous execution ("S"), or asynchronous execution ("A"). This information can be predetermined and stored prior to the user's request, but can also be updated and changed as needed. In the illustrated example, the assignment data 130 indicates that actions of the "reminder" action type are designated for asynchronous execution, so the execution selector module 122 determines that asynchronous execution of the user's request is appropriate.

The execution selector module 122 may perform additional processing to verify whether asynchronous execution is appropriate. For example, even if the action requested is of a type that is generally appropriate for asynchronous execution, the specific details of the request may make it less appropriate. For example, setting a calendar appointment for the next week may not be time-critical, but a setting an appointment for a time very soon after the request may increase the risk that the action may not be performed soon enough with asynchronous processing. The timing requirements of the user request can be taken into account, and synchronous processing is selected when needed to ensure timely execution.

A predetermined time window can be set, for all action types or for specific action types individually, so that actions that need to occur within the time window are performed synchronously even if they are otherwise appropriate to be performed asynchronously. This time window may be set according to an amount of time required to carry out asynchronous actions, for example, representing an average or worst-case time to execution for previous actions performed asynchronously. A specific time may be designated, such as 1 hour from the user request, or 4 hours from the user request. As another example, actions that are required to be performed the same day they are requested may be selected for synchronous execution. The time window for which asynchronous processing is appropriate may be the same for all action types, or may be different for individual action types, or may be set for specific actions.

In the example of FIG. 1, once the execution selector module 122 determines that the "reminder" action type is designated for asynchronous processing, the module 120 also compares the time for the reminder, e.g., tomorrow at 4:00 pm, with a time period for a time range restriction, e.g., the current day. Since the action does not need to be performed the same day it was requested, the execution selector module 122 confirms that asynchronous execution of the action should be used. If the reminder action had requested a reminder within the restricted time period, e.g., on the same day, the execution selector module 122 could have selected synchronous processing instead, to minimize the risk that a user would be inconvenienced by possible delays using asynchronous processing.

Other ways of determining asynchronous or synchronous execution can also be used. As an example, a classifier or series of rules can be used to determine whether asynchronous execution is appropriate for a requested action. As another example, the execution selector module 120 may generate one or more scores that reflect, for example, the time-sensitivity of the action requested, the potential inconvenience to a user by delaying execution, an estimated amount of delay that may occur through asynchronous execution, a likelihood that asynchronous execution would inconvenience the user, and so on. The score(s) can then be compared with one or more thresholds to determine whether asynchronous or synchronous execution is most appropriate for the requested action.

In stage (E), the server system 110 generates a confirmation message indicating that the requested action will be performed. Rather than confirming that the action has been performed, the confirmation message acknowledge receipt of the request and/or promise to perform the action in the future. As a result, the confirmation can be provided without waiting until execution of the action is completed. The content of the confirmation message can be generated based on the requested action. For example, for the action of setting a reminder, message text 132 can be generated such as "Okay, I'll set the reminder." The message can be provided in any appropriate form, such as text data, audio data, or both. The server system 110 can use a text-to-speech module 124 to generate audio data 134 that includes a synthesized utterance of the message text.

In some instances, an initial confirmation indicating that the action will be performed serves as the primary confirmation to the user 102, and additional confirmation is not automatically provided after the action is eventually executed as promised. In other instances, additional confirmation that the action has been executed can be provided to the user 102 later in response to execution of the action or in response to a user request about the status of the action.

In stage (F), the server system 110 sends the confirmation message 136 to the user device 104. The user device 104 then outputs the confirmation to the user 102. In the illustrated example, the confirmation message 136 includes the audio data 134, and the user device 104 outputs audio with the synthesized speech of "Okay, I'll set the reminder." The confirmation message 136 may include the message text 130, and the user device 104 may additionally or alternatively display the message text 130 to provide confirmation to the user 102.

Because the server system 110 is handles execution of the requested action asynchronously, execution of the action does not block the entry or processing of additional user requests to the digital assistant. The user 102 may continue the conversation with the digital assistant before or while the requested action is performed. Additionally, since the action is executed by the server system 110, execution does not consume processing resources or power on the user device 104, and execution does not demand any particular hardware or software requirements of the user device 104. This enhances the operations for user devices that have limited processing capabilities and/or battery power constraints. It can also increase the flexibility of the system, since execution is independent of the configuration and capabilities user device. Any appropriate type of device can be used to request an action that is performed asynchronously, regardless of whether the user device has a local application installed that can execute the action requested.

In stage (G), the server system 110 begins the process of executing the requested action by writing action data 140 corresponding to the user request in a data storage system 142, which may be a database, a table, a file system, or other appropriate data storage system. The action data 140 can include a record that specifies the specific action to be performed, e.g., the information determined by the request interpreter module 120. The action data 140 can also include a user identifier that indicates the identity or user account of the user 102. In general the action data 140 can include a collection of data having the appropriate information needed to carry out the requested action for the particular user 102 that requested the action. The information for requested actions of many different users may be stored temporarily in the data storage system 142 until the completion of asynchronous processing of the actions.

In some implementations, the data storage system 142 designates the action data 140 for an action as corresponding to a particular action type. The action data 140 can be stored in a manner that associates the action data 140 with the corresponding action type. For example, the action data 140 may be assigned a code or label that indicates the action type. As another example, the action data 140 may be stored in an area of the data storage system 142 corresponding to the action type. The data storage system 142 may include a plurality of data storage areas, illustrated as columns in FIG. 1, that each correspond to a different action type. The action data 140 for an action is stored in the data storage area for the corresponding action type. For example, the action data 140 for the "reminder" action is stored in the area designated for "reminder" actions.

The write request that causes the action data 140 to be stored can trigger other processes that facilitate execution of the action. As discussed above, each action type can be associated with an application or service used to carry out actions of that type. The different applications and services may use different types of input data or different data formats. Each action type can have a particular software module 146a-146d or "plugin" used to facilitate communication with the application or service for carrying out actions of that type. The use of separate modules 146a-146d for different action types allows the server system 110 to perform a wide range of action types with different applications or services. Separating the modules 146a-146d also makes it easier to identify and correct problems and to update the processing for individual action types. The modules 146a-146d can be small, in some implementations, on the order of about 100 lines of code. Each module 146a-146d can be configured to format data about an action into an appropriate request and send a remote procedure call with the formatted data to an appropriate server to carry out the action. As a result, the server system 110 can direct the execution of each action requested by the user 102 and other users by running the module 146a-146d corresponding to the action type.

To schedule the asynchronous execution of many actions requested by different users, the server system 110 can prioritize execution using a buffer or queue. In FIG. 1, the server system 110 uses a first-in first-out queue 148, where each item in the queue 148 represents an action that was selected to be performed asynchronously and has not yet been performed. When the action data 140 for a requested action is written to the data storage system 142, a token 150 for the action is added to the queue 148. This token 150 can include a reference to the corresponding action data 140. The server system 110 processes the items in the queue 148 in the sequence they were added. For example, processing the token 150 can involve executing the module 146c that corresponds to action type of the action data 140. As a result, after a delay while other items in the queue 148 are processed, the module 146c is invoked to use the action data 140 to generate a remote procedure call, API call, or other request to carry out the action requested by the user 102. In the example, the module 146c is configured to generate requests to the application server 112 to set or adjust reminders.

In stage (H), the server system 110 sets a time constraint for execution of the user-requested action. The amount of delay caused by the application server 112 may be highly variable, especially for a third-party application server. To ensure that the requested action occurs within the required amount of time, the server system 110 sets a time period 152 for the request, e.g., a timeout period or maximum amount of time allowed. As an example, the server system 110 may allow up to two minutes, or five minutes, or some other limited amount of time for the action to be completed. The length of the time period 152 can be set globally for all action types, or may be set individually for specific action types or specific application servers.

In stage (I), the server system 110 sends a request 160 generated by the module 146c to the application server 112, and the application server 112 carries out the user-requested action. In some instances, the application server 112 is a back-end server for a third-party application. Once the application server 112 carries out the user-requested action, e.g., by setting the reminder for the user 102 in FIG. 1, data for the reminder action is stored by the application server 112, e.g., in cloud storage. The application server 112 can synchronize data with the user device 104 and other user devices associated with the user account for the user 102. As a result, actions like making a list, setting a calendar appointment, setting a reminder or alarm, and other actions can be carried out by one or more servers, and the results synchronized to any appropriate devices of the user 102 so the devices locally store any status or configuration information needed for the devices. In some implementations, the server system 110 may perform synchronization of data to user devices when confirmation of completion of an action is received, in addition to or instead of synchronization by the application server 112.

The application 112 also sends confirmation 162 to the server system 110 to indicate when execution of the requested action has been completed. The server system 110 monitors the status of the request 160, to ensure that the confirmation of execution is received within the time period 152 set for the action. When confirmation is received within the time period 152, the server system 110 can log the confirmation and end tracking the action. If confirmation is not received within the set time period 152, the server 110 can retry the request 160. In addition, or as an alternative, the server system 110 can send a message to the user device 104, to indicate to the user 102 that the request has been delayed. After a certain amount of time, e.g., since the initial request 115 or the time the request 160 is sent to the application server 112, the server system 110 can notify the user that the requested action has failed, and that the action will not be performed as previously indicated.

The system 100 can track the status of each user request and be configured to provide status information to the user 102 if requested. For example, the user 102 may ask the digital assistant, "Has my reminder been set?" The server system 110 can check a log or record to determine actions requested by the user, identify the action being referred to (e.g., the most recent request to set a reminder), and determine the status of the request. The server system 110 can then provide a message, e.g., in text, synthesized audio, or both, that indicates whether the action has been executed or not.

In some implementations, user requests are buffered by the user device 104, in addition to or instead of requests being buffered using the data storage 142 and queue 148 of the server system 110. For example, the buffering of user requests can be extended to a conversational agent implemented on the user device 102. The client device 102 can use an on-device buffer when it needs to execute actions using a server, but has no internet connection at the time of the user's conversation. For example, after the user 102 speaks a command, the user device 104 may acknowledge receipt of the input, and indicate that processing will occur in the future. The user device 104 may continue accepting additional commands and storing the data, until an appropriate connection with the server system 110 is available. Once a connection is established, the user device 104 may communicate with the server system 110 for interpretation and processing of requests, or may communicate directly with application servers.

In some implementations, the user device 104 performs some or all of the functions described as being performed by the server system 110. For example, the client device 104 may include a speech recognition module, a text-to-speech module, as well as software to interpret a user request and determine whether asynchronous execution is appropriate. As another example, a client device 104 may use a server system 110 for speech recognition to obtain a transcription, but interpret the user request and manage execution of actions. As a result, in some implementations, the user device 104 can interpret a user request and provide a confirmation message to a user independent of a server system. The user device 104 may then manage execution of buffered asynchronous requests, including monitoring requests to servers and verifying completion within a timeout period, while the digital assistant accepts other requests from the user in parallel. The client device 104 may include local data storage and a queue or other buffer to manage asynchronously executed actions that involve one or more application servers. In some implementations, the client device 104 uses buffering of requests to manage network connectivity outages and delays or unavailability of application servers 112. For example, although a requested action may be designated as being most appropriate for synchronous execution, upon determining that connectivity with an application server needed to perform the action is not available, the client device 104 may store data causing the action to be performed at a later time. For example, the task may be scheduled, placed in a buffer of tasks to be completed, set to occur in response to connectivity being restored, and/or set to be retried at a certain time period. The client device 104 can use a multi-threaded or multi-process technique to receive and fulfill other user requests in the meantime.

Figure 2:
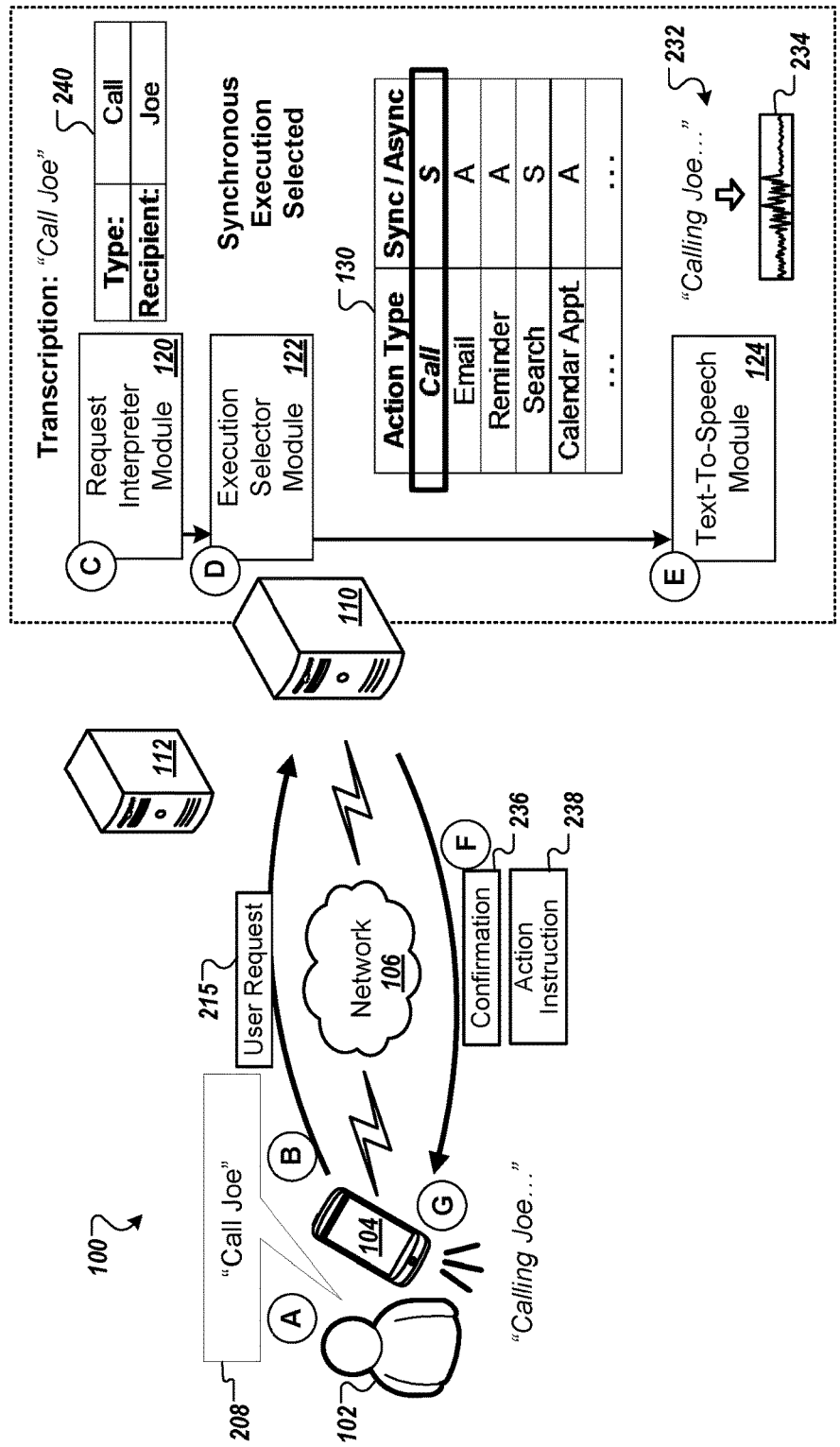

FIG. 2 is a diagram that illustrates another example of the system 100 for asynchronous processing of user requests. In the example of FIG. 2, the user 102 requests an action that is not classified as an action to be performed asynchronously. As a result, while the server system 110 is capable of performing actions asynchronously, the server system 110 chooses to process the action synchronously instead. FIG. 2 also illustrates a flow of data, shown as stages (A) to (G), which represent a flow of data. Stages (A) to (G) may occur in the illustrated sequence, or in a sequence that is different from the illustrated sequence. For example, some of the stages may be occur concurrently.

In stage (A), the user 102 speaks a voice command 208, "Call Joe," which refers to one of the user's contacts. In stage (B), the user device 104 sends a request 215 comprising audio data for the voice command 208 to the server system 110. In stage (C), the server system 110 performs speech recognition on the received audio data, then interprets the request. The server system 110 determines that the request 215 corresponds to a "call" action type, and that the recipient is "Joe."

In stage (D), the server system 110 accesses the assignment data 130 and determines that the "call" action type is designated for synchronous processing. Users generally would not welcome a delay in initiating a call, and so synchronous processing is most appropriate.

In stage (E), the server system 110 determines a confirmation message having text 232 of "Calling Joe." The text-to-speech module 124 is used to generate audio data 234 including a synthesized utterance of the confirmation message. In stage (F), the server system 110 sends confirmation message 236, which can include the text 232 and/or audio data 234 for output at the user device 104.

The server system 110 also generates and sends an action instruction 238 that includes the action information 240 determined by analysis of the request 215. The action information 240 may indicate the action type and other parameters of the action requested. For example, the action instruction 238 may indicate that the request 215 is a request to initiate a phone call, and that the recipient is "Joe." In some implementations, the action instruction 238 may indicate a particular application or service that the user device 104 should invoke to carry out the action. For example, the action instruction may include an application identifier or server address to indicate how the user device 104 should perform the action.

The user device 104 then causes the requested action to be performed. For example, in response to receiving the action instruction 238, the user device 104 can open a phone application, e.g., one that is determined to be associated with the "call" action type or is specified by the action instruction 238, access a contact record indicating the phone number for contact "Joe," and initiate the call. The user device 104 also outputs the confirmation from the server system 110, for example, displaying and/or playing audio from the confirmation message 236. In addition, or as an alternative, the user device 104 can output a confirmation for the phone application that initiates the call. By contrast with the process illustrated in FIG. 1, the process of FIG. 2 relies on the user device 104 to perform the action, and thus requires the user device 104 to have the correct application for performing the action installed and properly configured. Thus for synchronous execution, the user device 104 manages execution of an action by generating requests to back-end servers and synchronizing data.

When synchronously performing requested actions, the user device 104 can initially save data locally to the user device 104, rather than data being initially updated and stored at the server system 110 or an application server 112. The user device 104 then initiates synchronization with other devices of the user 102. For example, if the user 102 requests a new reminder or a change to a list, the application on the user device 104 may update or generate reminder or list data stored at the user device. Thus, a local list at the user device 104 can be updated before instructing a server of the change. In some instances, the user device 104 can generate and send a request to an appropriate back-end application server 112 to carry out the requested action.

In the example of FIG. 2, the user device 104, rather than the server system 110, is responsible for performing the action, including any communications with application servers 112, and if the user device 104 encounters an error or does not have an appropriate application installed, execution of the action may fail. Further, the digital assistant functionality is often generally blocked from accepting new requests while the current request is being executed. As a result, delays in performing the action or communicating with an application server 112 can delay the ability of the user 102 to enter a new request. Because the action is attempted synchronously with the request, however, the user 102 can be informed of any errors encountered before moving on to a later request.

Once the user device 104 has carried out the action requested, the user device 104 initiates synchronization of data with the server system 110. For example, an application of the user device 104 can send data indicating an updated reminder or note, and instruct synchronization to occur. The server system 110 then sends the new data to other user devices to complete the synchronization process. However, because the process requires communication between the user device 104 and server system 110, synchronization may fail if the user device 104 is improperly configured or loses network access. A local application on the user device 104 that does not reliably perform an action or synchronize data may ultimately fail to make the change the user requested.

By contrast, in the example of FIG. 1, the server system 110 manages execution of the requested action. As a result, the server system 110 and/or the application server 112 obtain data indicating any updates, and can synchronize updated data with other user devices, independent of the configuration or capabilities of the user device 104.

In the example of FIG. 2, the user device 104 bears responsibility for carrying out the action requested. Often, there may be little or no monitoring that the action is completed once the local application is invoked. Some applications may not be configured to confirm to the digital assistant when actions are performed and synchronized. As a result, if the local application does not properly perform the action, or if an application server 112 causes a delay or error, the action may not occur. In the example of FIG. 1, because the server system 110 monitors requests to the application server 112, the server system 110 can help ensure that an application server 112 performs the action requested, e.g., by verifying that confirmation is received, requesting retries of the action by the application server 112 when needed, and sending a notice to the user 102 if the action fails. Thus, rather than relying solely on a local application and an associated 112 to be fault tolerant, the asynchronous processing of FIG. 1 adds an additional level of monitoring that increases reliability of the execution of user-requested actions.

In some implementations, for the examples of either or both of FIG. 1 and FIG. 2, the server system 110 uses additional information to determine whether a requested action should be performed synchronously or asynchronously. For example, the user device 104 can send context information indicating its current context. This context information may include, for example, data indicating items visible on a display of the user device 104, data indicating applications installed or running on the user device 104, and so on. The server system 110 can assess the context information and determine whether the current context would alter the predetermined assignment of execution modes for the requested action. For example, a request to add an item to a list generally not time-critical, and so "list" actions could be designated as appropriate for asynchronous execution. However, when a user has the list visible, the user will generally expect to see new items be added to the list as they are mentioned, not with a potential delay. As a result, to provide a better experience to the user, when a "list" action is requested and the context information indicates that the "list" application is running, the server system 110 can select synchronous execution rather than asynchronous execution. This would send the interpretation of the request to the user device 104 most quickly, allowing the user device 104 to update the potentially visible list without delay.

Figure 3:
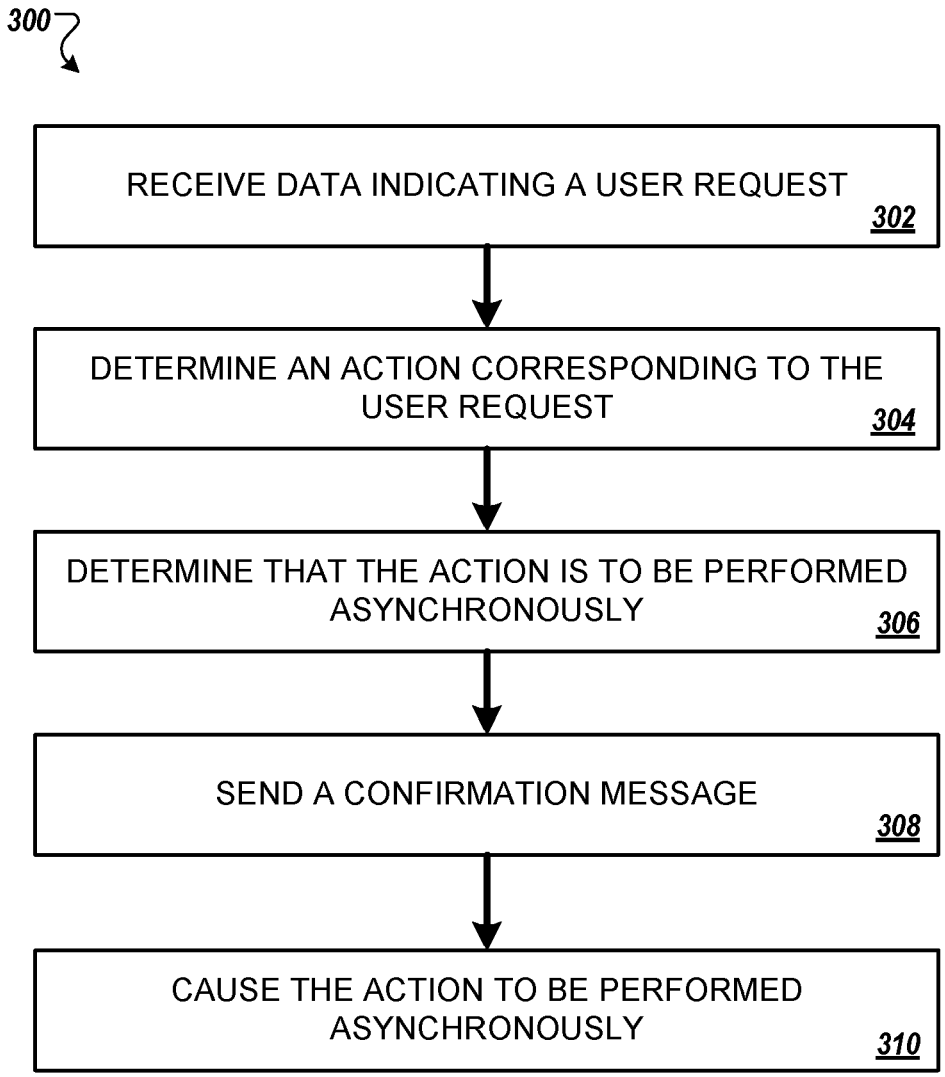
FIG. 3 is a flow diagram that illustrates an example of a process for asynchronous processing of user requests.

FIG. 3 is a flow diagram that illustrates a process 300 for asynchronous processing of user requests. The process 300 can be performed by one or more processing devices. The one or more processing devices can include a client device, a server system, or a combination of both a client device and a server system. In some implementations, the actions of the process 300 may be performed exclusively by a client device or a server system. As additional examples, a processing device may be a mobile phone, smart phone, personal digital assistant (PDA), music player, e-book reader, tablet computer, wearable computing device such as a watch, glasses, or necklace, laptop computer, desktop computer, or other portable or stationary computing device. As additional examples, a processing device may be a central processing unit (CPU) of a device, a particular processing core within a CPU, and so on. As discussed above, the techniques may be performed by the server system 110 of FIGS. 1 and 2, which assists in performing actions that a user requests at the user device 104.

Data indicating a user request to a digital assistant is received (302). For example, a server system can receive data indicating a user request made at a client device. When the digital assistant receives voice input, the received data may include audio data describing speech of the user. When the digital assistant receives text input, the text can be received.

An action corresponding to the user request is determined (304). For example, speech recognition can be performed on audio data of a voice input to determine text of the user request. The text can be analyzed to determine what action is requested. For example, a system can determine which of multiple predetermined categories or action types is appropriate for the request. An action can be determined from the text of a request by, for example, comparing the text to one or more patterns or grammars for different actions, parsing the text and identifying words or phrases corresponding to specific actions, or other techniques.

It is determined that the action is classified as an action that can be performed asynchronously to the user request (306). For example, certain actions or types of actions can be assigned as appropriate for synchronous or asynchronous execution. In some implementations, a system determines that the action corresponds to a particular action type. Assignment data is accessed that indicates whether different action types are assigned to be executed synchronously or asynchronously to a request. Based on the assignment data, a system can determine that the particular action type is assigned as capable of being executed asynchronously to a request. As another example, certain applications or services may be designated for asynchronous or synchronous processing. A system can determine which application or service performs an action, and select asynchronous or synchronous execution based on the corresponding application or service.

Other factors may be considered in determining whether to perform an action synchronously or asynchronously. For example, a device may determine that an action that is classified as appropriate for synchronous execution. However, the device may determine that the action involves communication with a server, and that network connectivity is temporarily disconnected or that the server is currently responding slowly or is unavailable. As a result, the device can determine to execute the action asynchronously instead, for example, by placing the task in a buffer or queue, or scheduling later execution. In this manner, asynchronous execution can be selected for an action that is not classified as being appropriate for synchronous execution, either for the first attempt to carry out the action or for a re-try after an initial synchronous process has failed to perform the action.

Similarly, an action classified as being appropriate for asynchronous execution may nevertheless be performed synchronously based on one or more factors. In some implementations, the parameters of the requested action can be analyzed to determine whether an action should be classified to be performed asynchronously. For example, a time corresponding to a requested action, such as a time an event or output is scheduled to occur, can be determined. The time can be compared with another time or a time period to determine whether the time corresponding to the requested action is at least a minimum amount of time from a current time, e.g., the time of the request. If the time corresponding to the requested action is before a threshold time, then the action can be classified as one for synchronous execution rather than asynchronous execution.

In some implementations, information indicating the context of the client device is used to classify a requested action. For example, if the user requests an action for an application that is determined to be running or visible on the client device, the action can be classified as one for synchronous execution rather than asynchronous execution.

A confirmation message is sent for output at the client device (308). For example, based on determining that the action should be performed asynchronously, a system can provide a confirmation message indicating that the request will be performed in the future. This confirmation can be provided before the action is executed. In some instances, a server system provides the confirmation before requesting execution of the action by another server system, such as an application server.

To provide the confirmation, the text of a confirmation message can be determined. A text-to-speech system can be used to generate audio data comprising synthesized speech, and the audio data can be provided to the client device, e.g., over a network.

The action is caused to be performed asynchronously to the user request (310). The execution of the action can be decoupled from the user's conversation with the digital assistant, allowing other requests to the digital assistant to be received and processed independently and in parallel to the first request. Thus, one or more other user requests from the user to the digital assistant may be received before performing the action requested by the first user request. Similarly, the actions corresponding to one or more other user requests from the user to the digital assistant may be performed before performing the action requested by the first user request.

In some implementations, a first server system may cause the action to be performed by storing a record indicating the action that is requested. Based on the stored record, the first server system can later generate and send a request to a second server system to request that the second server system perform the action.

In some implementations, a server system stores a record of the action to be performed in a data storage system that has multiple data storage areas. Each of the data storage areas can have an associated software module for processing records in the data storage area. For example, an area of a data storage system can be selected based on the identified action. A write request to store data about the action in the selected area can be sent. In response to the write request, a remote procedure call can be issued to execute software corresponding to the selected area of the data storage system. Using the executed software, a request to an application server to perform the action can be generated.

In some implementations, the action is caused to be performed by sending a request to a server system to perform the action, setting a timeout period for completion of the action, determining that the action is completed before the end of the timeout period, and storing data indicating execution of the action.

In some implementations, data is received indicating a second user request to the digital assistant at the client device. A second action corresponding to the second user request is determined. It is determined that the second action is not classified as an action to be performed asynchronously to the second user request. Based on determining that the second action is not classified as an action to be performed asynchronously to the second user request, the second action can be caused to be performed synchronously with respect to the user request. Confirmation can be provided to the client device after synchronous execution has completed.

In some implementations, data is received indicating a second user request to the digital assistant at the client device. A second action corresponding to the second user request is determined. It is determined that the second action is classified as an action to be performed asynchronously to the second user request. Based on determining that the second action is classified as an action to be performed asynchronously to the second user request, performance of the second action is initiated. It is determined that the second action is not performed within a timeout period. As a result, a message indicating that performance of the second action has failed is provided for output at the client device. In some implementations, multiple attempts to perform the action, each with a corresponding timeout period, may be made before indicating that the action has failed.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A computer-implemented method comprising:
   storing, at a user device, predetermined assignment data that specifies, for each of multiple different action types, whether asynchronous performance or synchronous performance is assigned for handling user requests associated with a corresponding one of the multiple different action types;
   after storing the assignment data, receiving, by the user device, data indicating a user request from a user of the user device that is directed to a digital assistant;
   determining, by the user device, (i) an action corresponding to the user request and (ii) a particular action type that is associated with the action, wherein the particular action type is one of the multiple different action types;
   based on the predetermined assignment data and the particular action type associated with the action corresponding to the user request, selecting, by the user device, between (i) performance of the action synchronously with respect to the user request such that the action is performed before the user device performs a subsequent action requested by a subsequent user request from the user and (ii) performance of the action asynchronously with respect to the user request such that the user device is configured to perform the subsequent action before or in parallel with the action;
   generating, by the user device, one or more confirmation messages for output to the user, the confirmation message indicating an intent to perform the action; and
   causing, by the user device, the action to be performed synchronously or asynchronously with respect to the user request according to the selection.

2. The method of claim 1, wherein the predetermined assignment data indicates that the particular action type that is associated with the action of the user request is assigned to be performed synchronously when network connectivity is connected, and further comprising:
   determining that the network connectivity is disconnected; and
   selecting (ii) performance of the action asynchronously with respect to the user request based on determining that the network connectivity is disconnected.

3. The method of claim 1, wherein the predetermined assignment data indicates that the particular action type that is associated with the action of the user request is assigned to be performed synchronously, and further comprising:
   identifying, by the user device, an application server configured to perform the action;
   determining that the application server is responding slowly; and
   selecting (ii) performance of the action asynchronously with respect to the user request based on determining that the application server is responding slowly.

4. The method of claim 1, wherein selecting between (i) performance of the action synchronously with respect to the user request and (ii) performance of the action asynchronously with respect to the user request comprises selecting (ii) performance of the action asynchronously with respect to the user request; and
   wherein causing the action to be performed synchronously or asynchronously with respect to the user request according to the selection comprises causing the action to be performed asynchronously with respect to the user request.

5. The method of claim 4, wherein selecting between (i) performance of the action synchronously with respect to the user request and (ii) performance of the action asynchronously with respect to the user request further comprises:
   identifying, by the user device, an application server configured to perform the action,
   determining, by the user device, that connectivity with the application server is not available, and
   based on determining that connectivity with the application server is not available, selecting performance of the action asynchronously with respect to the user request.

6. The method of claim 5, wherein causing the action to be performed asynchronously with respect to the user request comprises:
   storing, by the user device, a record indicating the action that is requested; and
   based on the stored record, sending a request to the application server to perform the action.

7. The method of claim 6, further comprising:
   sending a request to the application server to perform the action based on the stored record when one or more of the following conditions are determined to be satisfied:
   connectivity with the application server being restored,
   a certain time period expiring,
   a scheduled performance time occurring, and
   a place in a queue of actions to be performed asynchronously, wherein the actions of the queue are performed in an order corresponding to their places within the queue.

8. A system, comprising:
one or more memory devices storing computer-readable instructions;
one or more processors executing the computer-readable instructions to cause the one or more processors to:
receive, by a user device of a user, data indicating a user request from the user that is directed to a digital assistant;
determine, by the user device, an action corresponding to the user request;
identify, by the user device, one or more parameters associated with performing the action;
identify, by the user device, one or more servers configured to perform the action;
based on the one or more parameters associated with performing the action and connectivity to the one or more servers configured to perform the action, select, by the user device, between (i) performance of the action synchronously with respect to the user request such that the action is performed before the user device performs a subsequent action requested by a subsequent user request from the user and (ii) performance of the action asynchronously with respect to the user request such that the user device is configured to perform the subsequent action before or in parallel with the action;
generate, by the user device, one or more confirmation messages for output to the user, the confirmation message indicating an intent to perform the action; and
cause, by the user device, the action to be performed synchronously or asynchronously with respect to the user request according to the selection.

9. The system of claim 8, wherein the instructions to determine that performance of the action should occur asynchronously with respect to the user request comprise instructions to:
determining whether the one or more servers is currently responding slowly or is unavailable.

10. The system of claim 9, wherein the one or more processors executing the computer-readable instructions further cause the one or more processors to:
select, by the user device, performance of the action asynchronously with respect to the user request based on the server currently responding slowly or being unavailable;
place, by the user device, a task corresponding to requesting that the server perform the action in a task buffer based on selecting performance of the action asynchronously with respect to the user request,
wherein the instructions to cause, by the user device, the action to be performed asynchronously with respect to the user request comprise instructions to cause performance of the task based on an order in which it was added to the task buffer with respect to other tasks in the task buffer.

11. The system of claim 9, wherein the one or more servers include a third-party application server, and wherein the instructions to determine that performance of the action should occur asynchronously with respect to the user request comprise instructions to:
determine, by the user device, that an additional server associated with the digital assistant is unavailable;
select, by the user device, performance of the action asynchronously with respect to the user request based on the additional server currently responding slowly or being unavailable;
place, by the user device, a task corresponding to requesting that the third-party application server perform the action in a task buffer based on selecting performance of the action asynchronously with respect to the user request, wherein:
tasks in the task buffer are performed in an order corresponding to when they are placed in the buffer, and
the instructions to place the task corresponding to requesting that the third-party application server perform the action in the task buffer includes instructions to cause the additional server to request that the third-party application server perform the action.

12. The system of claim 8, wherein the instructions to identify the one or more parameters associated with performing the action comprise instructions to:
determine an action type, of a plurality of action types, that corresponds to the action, wherein each action type indicates at least one parameter associated with performing actions corresponding to the action type; and
determine at least one parameter associated with performing the action based on the data indicating the user request.

13. The system of claim 12, wherein the instructions to determine that performance of the action should occur synchronously with respect to the user request comprises instructions to:
determine that the at least one parameter associated with performing actions corresponding to the action type of the action indicates that the action should occur asynchronously, and
determine that the at least one parameter associated with performing the action determined based on the data indicating the user request indicates that performance of the action should occur synchronously.

14. One or more non-transitory computer-readable storage media storing computer program instructions that, when executed by one or more processing devices of a server system, cause the one or more processing devices to perform operations comprising:
storing, at a user device, predetermined assignment data that specifies, for each of multiple different action types, which application is assigned for handling user requests associated with a corresponding one of the multiple different action types;
after storing the assignment data, receiving, by the user device, data indicating a user request from a user of the user device that is directed to a digital assistant;
determining, by the user device, (i) an action corresponding to the user request and (ii) a particular action type that is associated with the action, wherein the particular action type is one of the multiple different action types;
based on the predetermined assignment data and the particular action type associated with the action corresponding to the user request, selecting, by the user device, between (i) performance of the action synchronously with respect to the user request such that the action is performed before the user device performs a subsequent action requested by a subsequent user request from the user and (ii) performance of the action asynchronously with respect to the user request such that the user device is configured to perform the subsequent action before or in parallel with the action;
generating, by the user device, one or more confirmation messages for output to the user, the confirmation message indicating an intent to perform the action; and causing, by the user device, the action to be performed synchronously or asynchronously with respect to the user request according to the selection.

15. The one or more non-transitory computer-readable storage media of claim 14,
wherein the operations further comprise determining that the action corresponds to the particular action type, and
wherein selecting between (i) performance of the action synchronously with respect to the user request and (ii) performance of the action asynchronously with respect to the user request comprises:
accessing, by the user device, the predetermined assignment data, wherein the predetermined assignment data includes a value, for each specific action type of the multiple different action types, that indicates which applications associated with the specific action type are to execute which actions corresponding user requests that request that the actions of the specific action type be performed,
determining whether the predetermined assignment data indicates that the actions of the particular action type are assigned to a particular application.

16. The one or more non-transitory computer-readable storage media of claim 15, wherein the operations further comprise:
selecting performance of the action asynchronously with respect to the user request based on determining at least one of:
an application server associated with the particular application is currently responding slowly,
the application server associated with the particular application is currently unavailable,
network connectivity is disconnected, and
the particular application is not installed on the user device.

17. The one or more non-transitory computer-readable storage media of claim 14, wherein selecting between (i) performance of the action synchronously with respect to the user request and (ii) performance of the action asynchronously with respect to the user request comprises selecting (ii) performance of the action asynchronously with respect to the user request; and
wherein causing the action to be performed synchronously or asynchronously with respect to the user request according to the selection comprises causing the action to be performed asynchronously with respect to the user request.

18. The one or more non-transitory computer-readable storage media of claim 17, wherein causing the action to be performed asynchronously with respect to the user request comprises:
storing, by the user device, a record indicating the action that is requested; and
based on the stored record, sending a request to the application server to perform the action.

19. The one or more non-transitory computer-readable storage media of claim 18, wherein the operations further comprise:
sending a request to the application server to perform the action based on the stored record when one or more of the following conditions are determined to be satisfied:
connectivity with the application server being restored,
a certain time period expiring,
a scheduled performance time occurring, and
a place in a queue of actions to be performed asynchronously, wherein the actions of the queue are performed in an order corresponding to their places within the queue.

* * * * *